United States Patent [19]
Chen et al.

[11] Patent Number: 5,456,491
[45] Date of Patent: Oct. 10, 1995

[54] AIR BAG RECEIVED IN A SAFETY BELT

[76] Inventors: Fou-Min Chen; Chin-Chen Chen, both of No. 68, Yumin Street, Changhua City, Taiwan

[21] Appl. No.: 291,137
[22] Filed: Aug. 16, 1994
[51] Int. Cl.[6] .................................................. B60R 21/18
[52] U.S. Cl. ........................ 280/733; 280/729; 280/737
[58] Field of Search .................................. 280/733, 729, 280/737, 741, 807, 801.1

[56] References Cited

U.S. PATENT DOCUMENTS

| | | | |
|---|---|---|---|
| 4,291,897 | 9/1981 | Minami | 280/807 |
| 4,348,037 | 9/1982 | Law et al. | 280/733 |
| 4,971,354 | 11/1990 | Kim | 280/733 |
| 5,062,662 | 11/1991 | Cameron | 280/733 |
| 5,242,193 | 9/1993 | Humpal | 280/733 |
| 5,288,104 | 2/1994 | Chen | 280/733 |

FOREIGN PATENT DOCUMENTS

| | | | |
|---|---|---|---|
| 5262195 | 10/1993 | Japan | 280/729 |
| 1332051 | 10/1973 | United Kingdom | 280/733 |

*Primary Examiner*—Karin L. Tyson
*Assistant Examiner*—Paul N. Dickson
*Attorney, Agent, or Firm*—Nikaido, Marmelstein, Murray & Oram

[57] ABSTRACT

An air bag received in a safety belt, includes an air bag having an inlet defined therein which is connected to an out-put device, a safety belt having a reception portion defined therein for receiving the air bag in flat form therein, the safety belt coilably received in a box and a connecting device connecting to the box and operated by an action of the box when the safety belt is pulled to operate the out-put device to inflate the air bag.

1 Claim, 7 Drawing Sheets

AIR BAG RECEIVED IN A SAFETY BELT

BACKGROUND OF THE INVENTION

The present invention relates to an air bag, and more particularly, to the air bag received in a safety belt.

A conventional air bag is usually disposed in a central portion of a steering wheel in a flat form, which is inflated when a car accident happens and is designed to protect a driver's chest and head from hitting the steering wheel. However, the air bag is inflated by an explosive and that often hurts driver's hands when it explodes. Furthermore, the air bag only provides a soft area on the steering wheel, which cannot pull the driver back or reduce momentum of the driver when a car is stopped suddenly. Namely, if a driver weighing 50 kilograms drives a car at a speed of 60 km/hr and unfortunately, a car accident happens to him or her, the car is stopped and reduced to a speed of 0 km/hr suddenly, then there are 3000 kg-km/hr of momentum produced, but, if the driver has fastened his or her safety belt then the safety belt will restrain the driver back rather than let the driver helplessly impact forwardly on the inflated air bag, and this may reduce effectively damage happening to the driver. A conclusion is made which is that the air bag provides an idealized feature only if the safety belt is fastened.

The present invention intends to provide a safety air bag received in a safety belt to mitigate and/or obviate the above-mentioned problems.

SUMMARY OF THE INVENTION

The present invention provides an air bag received in a safety belt, the air bag is inflated by an out-put means which is operated by an operating means, the means is connected to a box where the safety belt is coilably engaged and when the safety belt is pulled suddenly by a certain force the box performs an action to operate the operating means, such that a driver is protected not only by the air bag but also by the safety belt.

It is an object of the present invention to provide a safety belt in which is received a flat air bag which is inflated when the safety belt is pulled suddenly by a certain force.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
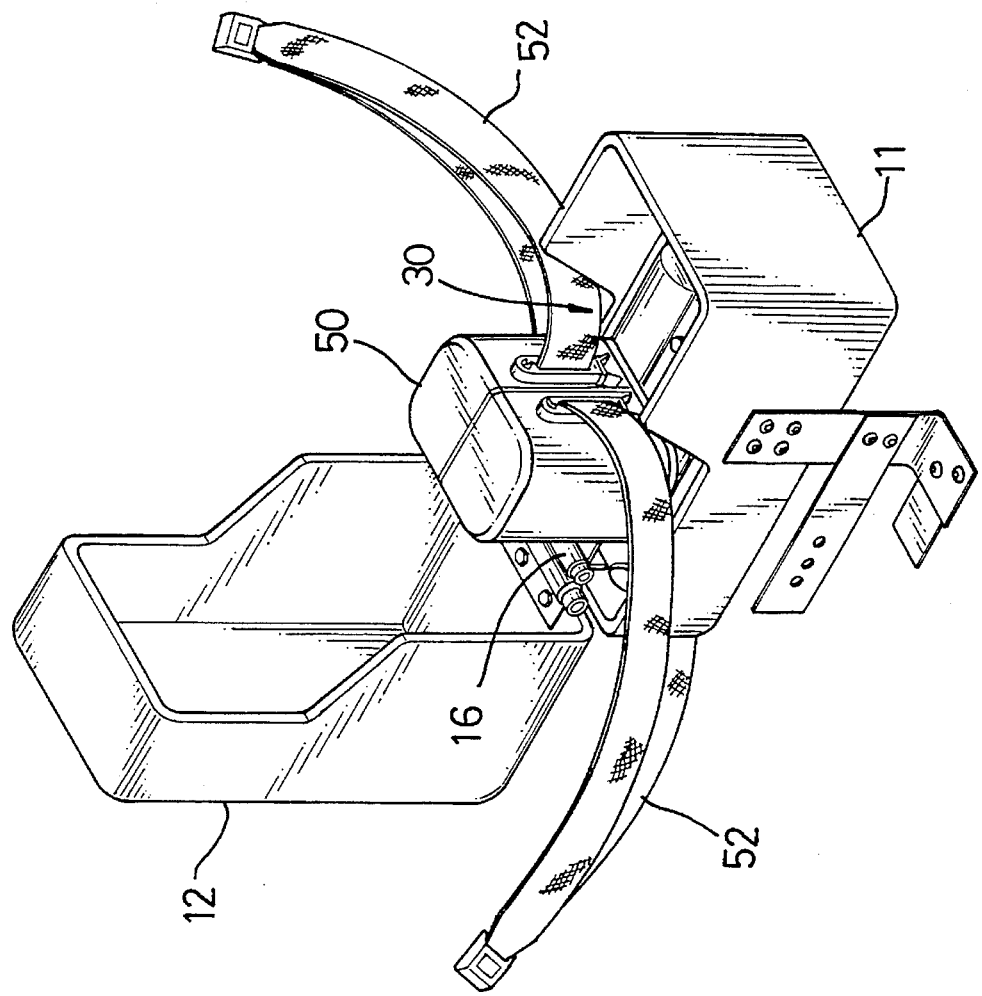
FIG. 1 is a perspective view of a safety belt receiving an air bag therein and its correspondent devices in accordance with the present invention.
Figure 2:
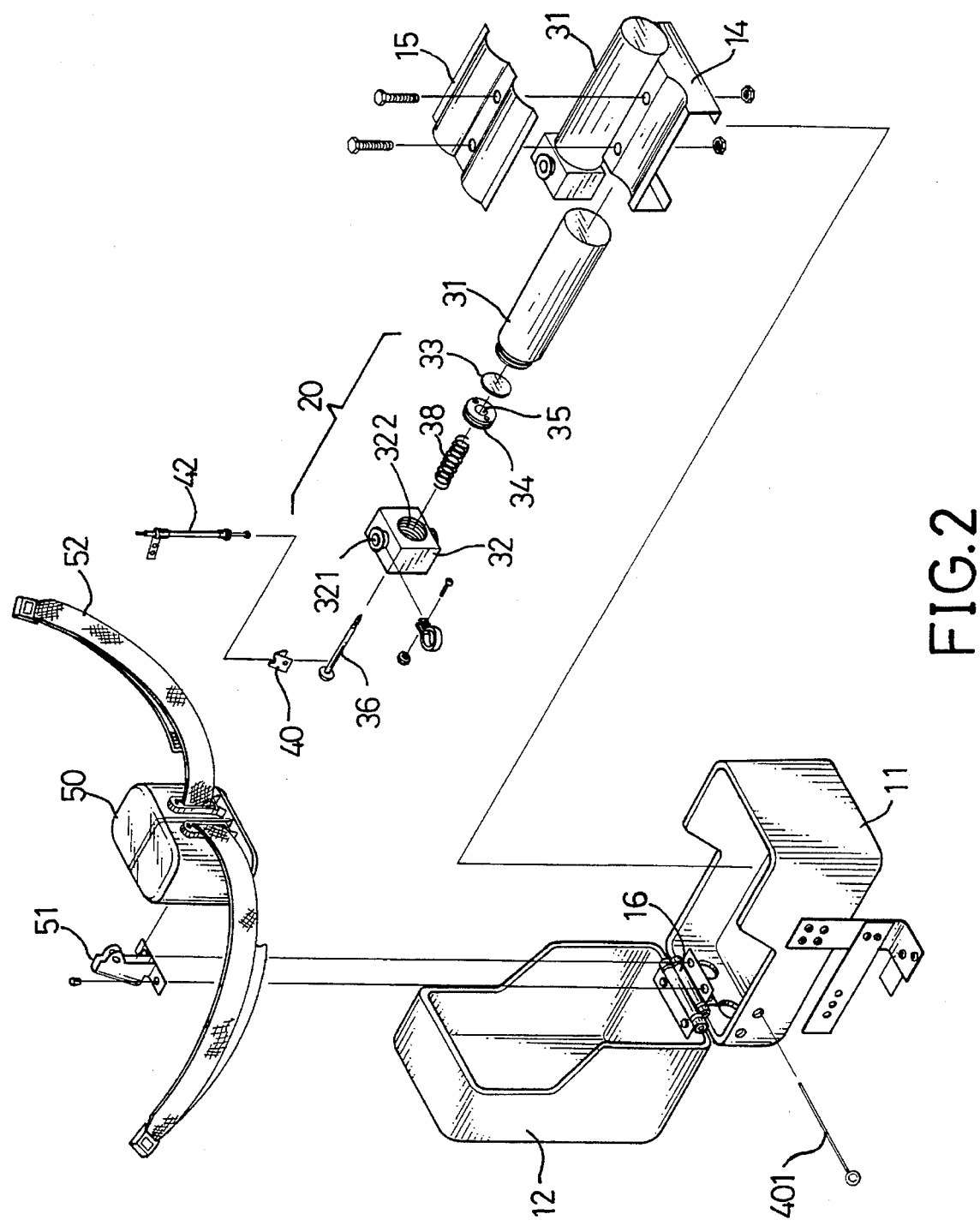
FIG. 2 is an exploded view of the belt shown in FIG. 1 in accordance with the present invention.
Figure 3:
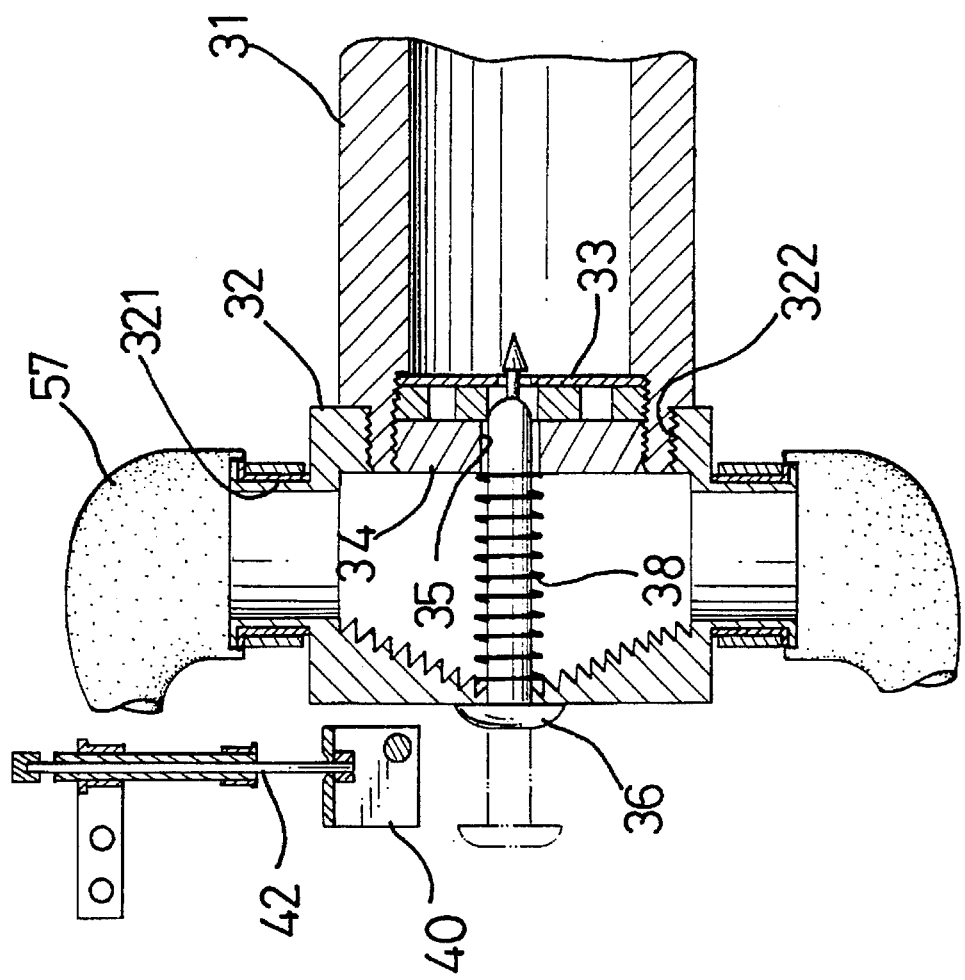
FIG. 3 is a side elevational view, partly in section, of a bottle and a connecting means to inflate the air bag in accordance with the present invention.
Figure 4:
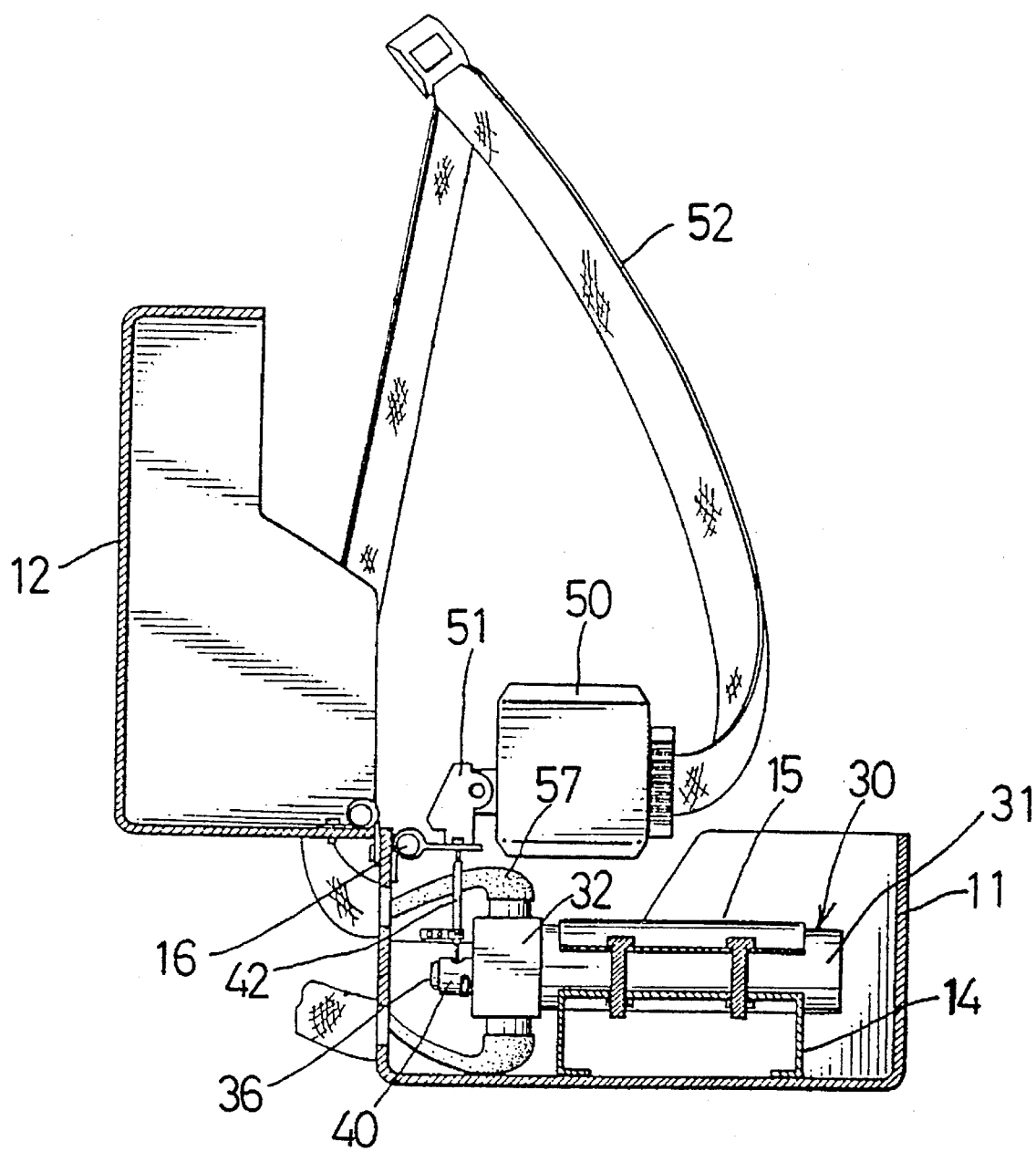
FIG. 4 is a side elevational view of the safety and its correspondent device in accordance with the present invention.
Figure 5:
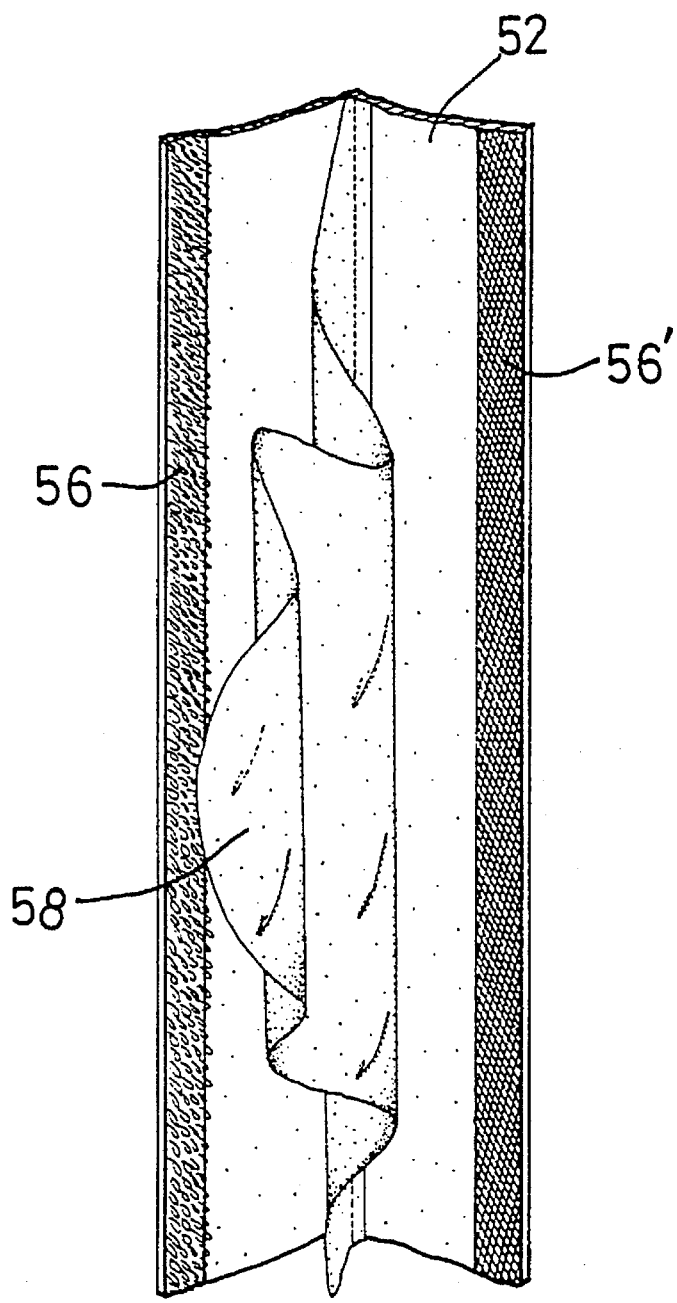
FIG. 5 is a perspective view of an air bag received in the safety belt in accordance with the present invention.
Figure 6:
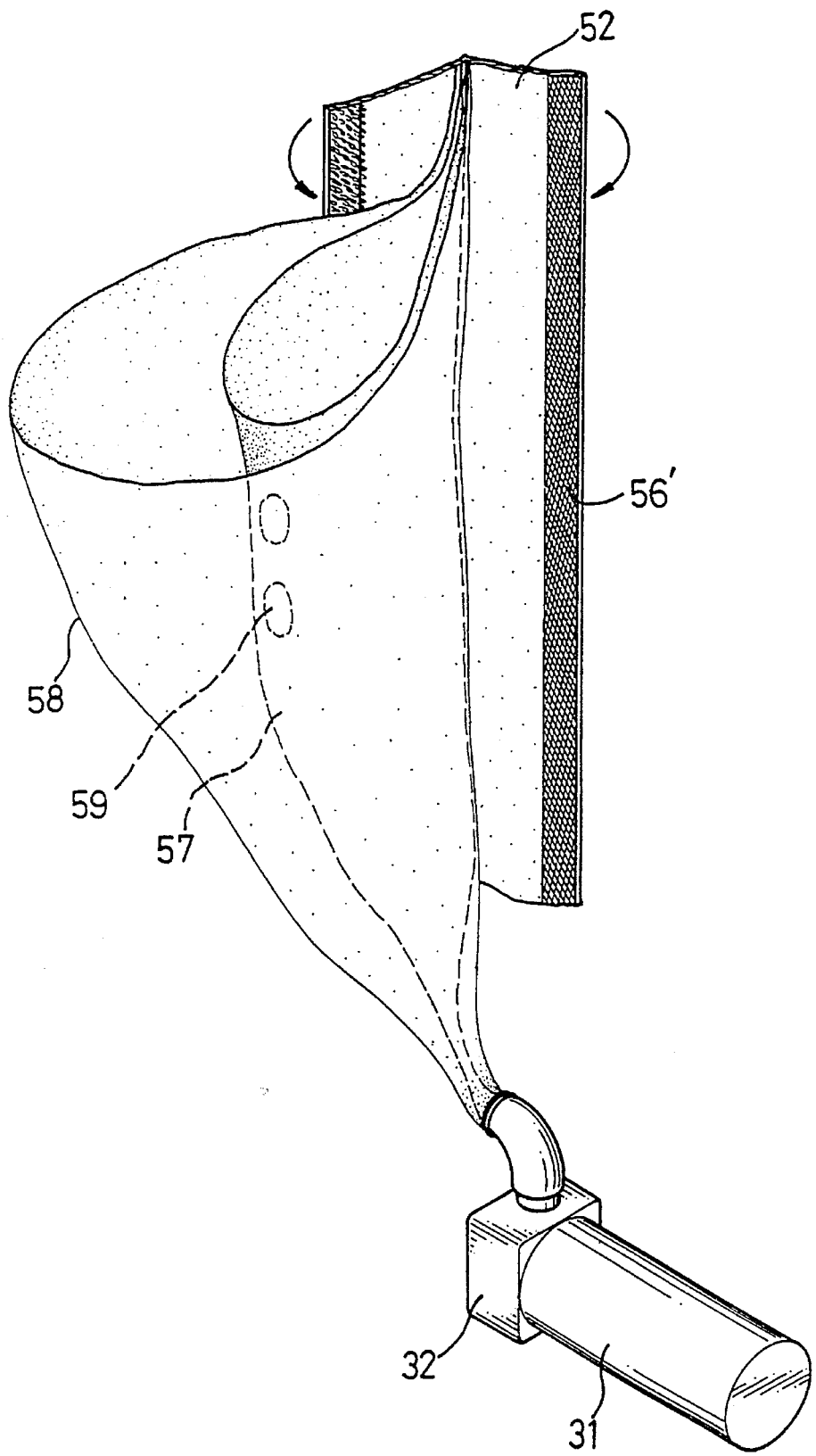
FIG. 6 is a perspective view, partly in section, of the air bag having an inner bag therein in accordance with the present invention.

Referring to the drawings and initially to FIGS. 1 through 6, an air bag received in a safety belt in accordance with the present invention includes an air bag 58, a safety belt 52, a box 50, an operating means 20 and an output means 30. The safety belt 52 has two ends, one of which is fixed to an inner portion of a vehicle such as a car and the other end thereof is coilably received in a box 50. The safety belt 52 is composed of two portions, each portion has a hook/loop element 56, 56' disposed longitudinally to a corresponding edge thereof such that the two portions are securely folded by engaging the hook/loop elements 56, 56' together to define a reception portion therein. The air bag 58 in a folded form is fixed on a crease of the two portions of the safety belt 52 and an inner bag 57 having a plurality of holes 59 defined therein is disposed in the air bag 58.

A case 11 has a cover 12 pivotally engaged thereto, a bracket 14 is fixed to an inner surface of the case 11 on which is disposed two bottles 31 which are securely engaged by an upper plate 15 disposed thereon. The out-put means includes the two bottles 31 in each of which compressed gas is received. Each bottle has an outlet which is sealed by a seal plate 33 and a cap 34 in which a hole 35 is defined. The operating means 20 includes a valve 32 in which four holes, two holes 321 defined in vertical direction and the other two holes 322 defined in horizontal direction (see FIG. 3) are defined, the valve 32 is threadedly engaged to the bottle 31 and a needle 36 with a spring 38 mounted thereon is inserted in the valve 32 and a stop 40 is disposed between the valve 32 and the needle 36 such that the spring 38 is compressed so as to keep a sharp tip of the needle 36 from piercing the seal plate 33 of the bottle 31. A safety rod 401 is inserted through holes defined in the stop 40 and passes beneath the needle 36 to prevent the stop 40 from being removed by accident. The inner bag 57 disposed in the air bag 58 is connected to the vertical hole 321 of the valve 32.

A connecting element 51 has first and second ends, the first end thereof pivotally engaged to the box 50 and the second end thereof fixedly engaged to a hinge 16 which is disposed to an inner side of the case 11 and has a high torque spring (figure not shown) disposed therein, namely, there needs a certain force can rotate the hinge 16 counterclockwise. A rod 42 has a first end connecting to the stop 40, and a second end connecting to the hinge 16.

When a car accident happens, the car is stopped suddenly and a driver wearing the safety belt 52 has a initial force towards a steering wheel of the car, the box 50 therefore is pulled by the safety belt 52 suddenly to rotate the box 50 about the connecting element 51 such that the box 50 and the connecting element 51 are pulled upward to rotate the hinge 16 counter-clock-wise if the force is larger than the torque of the torque spring disposed in the hinge 16. This action pulls the rod 42 upward and therefore removes the stop 40 from the position between the needle 36 and the valve 32, the needle 36 therefore pierces through the seal plate 33 of the bottle 31 via the hole 35 of the cap 34 to let the compressed gas received therein inflate the inner bag 57 via the hole 35 of the cap 34 and, inflates the air bag 58 via the holes 59 of the inner bag 57, and the inflated air bag 58 will separate the two hook/loop elements 56, 56' to form an inflated air bag in front of the driver.

Figure 7:
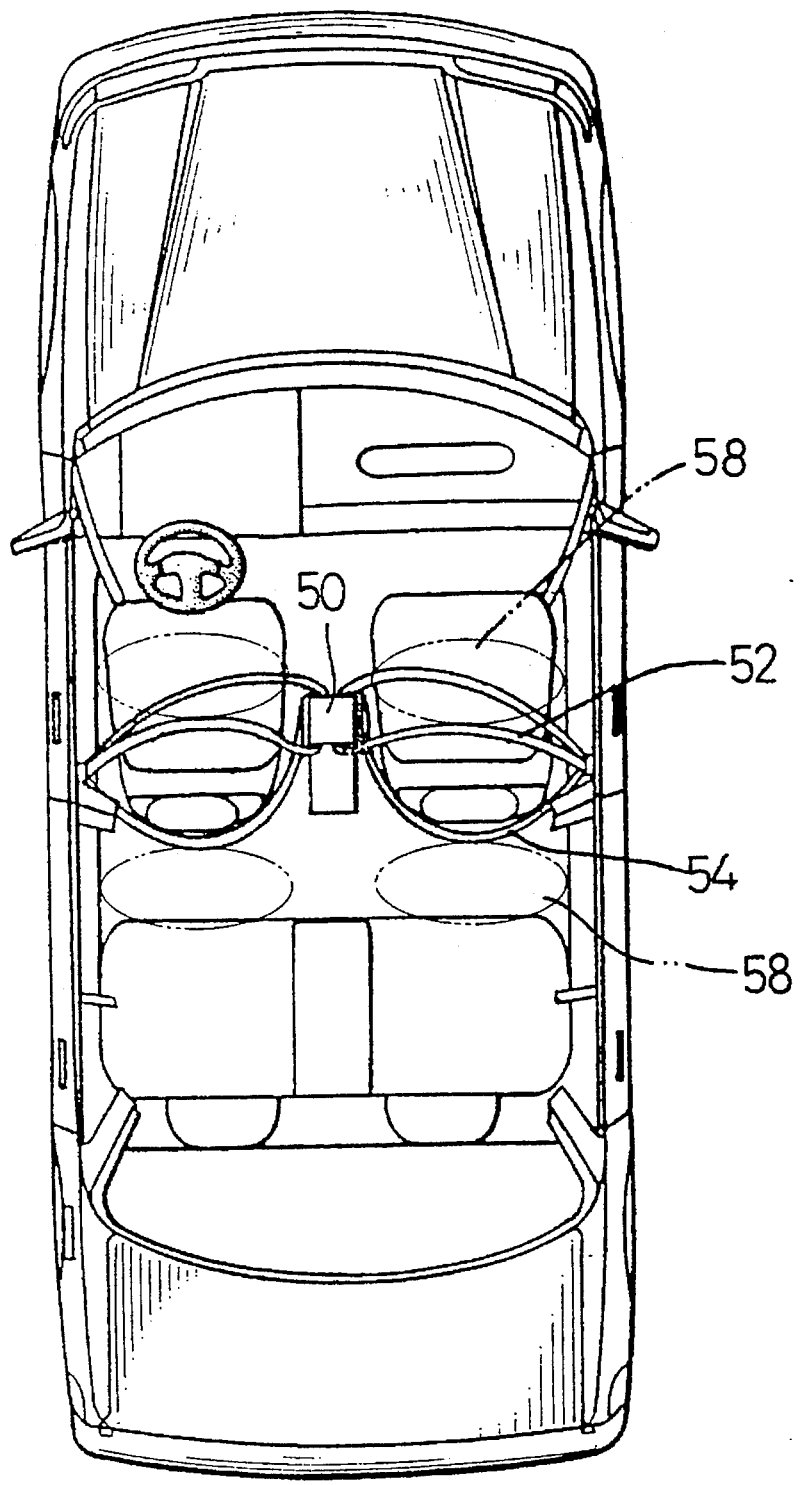
FIG. 7 is an embodiment of four air bags in inflated form shown in phantom lines from the safety belt in accordance with the present invention.

Referring now to FIG. 7, the present invention also can provide a rear seat air bag 58 which is received in another safety belt 54 around the front seat and corresponding thereto such that the air bag 58 will be inflated on the back of the front seat and therefore provides a better protection for the rear seat passenger.

Accordingly, the present invention discloses the air bag 58 received in the safety belt 54 and both of which provide the driver and the passengers safety protection, furthermore, the present invention also has a simpler structure compared to the conventional one.

Although the invention has been explained in relation to its preferred embodiment, it is to be understood that many other possible modifications and variations can be made without departing from the spirit and scope of the invention as hereinafter claimed.

I claim:

1. An air bag received in a safety belt, and comprising:

an air bag, said air bag having an inner bag disposed therein, said inner bag having a plurality of holes defined therein and having an inlet defined therein connected to an output means, said output means comprising at least one bottle, said bottle having an outlet sealed with a seal plate and comprising compressed gas therein;

a safety belt, said safety belt comprising two portions securely and longitudinally folded by disposing a hook/loop element to a corresponding edge thereof to define a reception portion by engaging said hook/loop elements together, said reception portion receiving said air bag therein, said safety belt connected to and coilably received in a box, the box being movably supported;

an operating means connected to said box for operating said output means to inflate said air bag in response to a predetermined force on said safety belt causing said box to move, said operating means including a valve having at least two holes defined therein, one hole thereof connecting to said inner bag of said air bag and the other hole thereof having a needle passing therethrough, said needle and said valve having a stop removably disposed therebetween and said stop connected to said box.

* * * * *